(12) United States Patent
Koegler et al.

(10) Patent No.: US 7,946,826 B1
(45) Date of Patent: May 24, 2011

(54) WIND TURBINE ROTOR BLADE WITH A SUCTION SIDE WINGLET

(75) Inventors: Klaus Ulrich Koegler, Rehine (DE); Ramesh Vedula, Bangalore (IN); Ariane Myriam Daisy Frère, Muenster (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/837,529

(22) Filed: Jul. 16, 2010

(51) Int. Cl.
*F03D 1/06* (2006.01)

(52) U.S. Cl. ........................................ 416/238; 416/242

(58) Field of Classification Search .................. 416/238, 416/242, 237; 244/199.4
See application file for complete search history.

(56) References Cited

U.S. PATENT DOCUMENTS

| | | | |
|---|---|---|---|
| 6,582,196 B1 * | 6/2003 | Andersen et al. | 416/238 |
| 2007/0252031 A1 * | 11/2007 | Hackett et al. | 244/199.4 |
| 2008/0093860 A1 | 4/2008 | Suzuki | |
| 2009/0068019 A1 | 3/2009 | Wobben | |
| 2009/0074583 A1 | 3/2009 | Wobben | |
| 2009/0257885 A1 | 10/2009 | Godsk et al. | |

FOREIGN PATENT DOCUMENTS

| JP | 2004/084590 | | 3/2004 |
|---|---|---|---|
| JP | 2004084590 A | * | 3/2004 |
| WO | WO 2006/059472 | | 8/2006 |

OTHER PUBLICATIONS

English Abstract of JP2004/084590, Published Mar. 18, 2004.

* cited by examiner

*Primary Examiner* — Richard Edgar
(74) *Attorney, Agent, or Firm* — Dority & Manning, P.A.

(57) ABSTRACT

A rotor blade for a wind turbine is disclosed. The rotor blade may comprise a root portion, a tip, and a body extending between the root portion and the tip. The body may include a pressure side and a suction side. Additionally, a winglet may be defined by the body. The winglet may terminate at the tip of the rotor blade and extend inwardly in a direction of the suction side of the body. Further, a bend may be defined in the body such that a portion of the body extends outwardly in a direction of the pressure side of the body.

20 Claims, 5 Drawing Sheets

FIG. 5

WIND TURBINE ROTOR BLADE WITH A SUCTION SIDE WINGLET

FIELD OF THE INVENTION

The present subject matter relates generally to rotor blades for a wind turbine and, more particularly, to wind turbine rotor blades with suction side winglets.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size, configuration and capacity of wind turbines. One such modification has been to include a wingtip device, such as a winglet, at the tip of each wind turbine rotor blade. Generally, winglets can be employed to improve the overall efficiency and performance of a wind turbine. For example, a winglet may decrease the amount of spanwise flow generated at the tip of a rotor blade and, thereby, reduce drag on the rotor blade. Winglets may also be installed on rotor blades to reduce the overall diameter of the wind turbine as well as to reduce noise emitted by the blades. Further, winglets may also provide an increase in the power coefficient of a wind turbine and, thus, reduce the cost of energy generated by the wind turbine.

While the various performance advantages, described above, can be provided to a wind turbine by both winglets extending away from the wind turbine tower (i.e., pressure side winglets) and winglets extending towards the tower (i.e., suction side winglets), it is generally understood that the greatest performance advantages can provided by a suction side winglet. However, for wind turbines having rotors upwind of the tower, suction side winglets can be very problematic. Specifically, installing a suction side winglet on a conventional rotor blade reduces the distance between the tip of the rotor blade and the tower. Such a reduction in tower clearance can dramatically increase the risk of one or more of the rotor blades striking the tower. When a tower strike occurs, the rotor blade and the tower can be significantly damaged and, in some instances, a tower strike can even bring down the entire wind turbine. Thus, tower strikes are very costly and require considerable downtime to repair or replace damaged components.

Accordingly, there is a need for a rotor blade that can accommodate a suction side winglet without increasing the likelihood of the rotor blade striking the tower.

BRIEF DESCRIPTION OF THE INVENTION

Aspects and advantages of the invention will be set forth in part in the following description, or may be obvious from the description, or may be learned through practice of the invention.

In one aspect, the present subject matter discloses a rotor blade for a wind turbine. The rotor blade comprises a root portion, a tip, and a body extending between the root portion and the tip. The body includes a pressure side and a suction side. Additionally, a winglet may be defined by the body. The winglet may terminate at the tip of the rotor blade and extend inwardly in a direction of the suction side of the body. Further, a bend may be defined in the body such that a portion of the body extends outwardly in a direction of the pressure side of the body.

In another aspect, the present subject matter discloses a wind turbine. The wind turbine may include a tower and a nacelle mounted atop the tower. A rotor may be coupled to the nacelle and may include a hub. The wind turbine may also include at least one rotor blade extending from the hub. The rotor blade may define a suction side winglet extending inwardly in a direction of the tower. Additionally, a bend may be defined in the rotor blade such that a portion of the rotor blade extends outwardly in a direction away from the tower.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
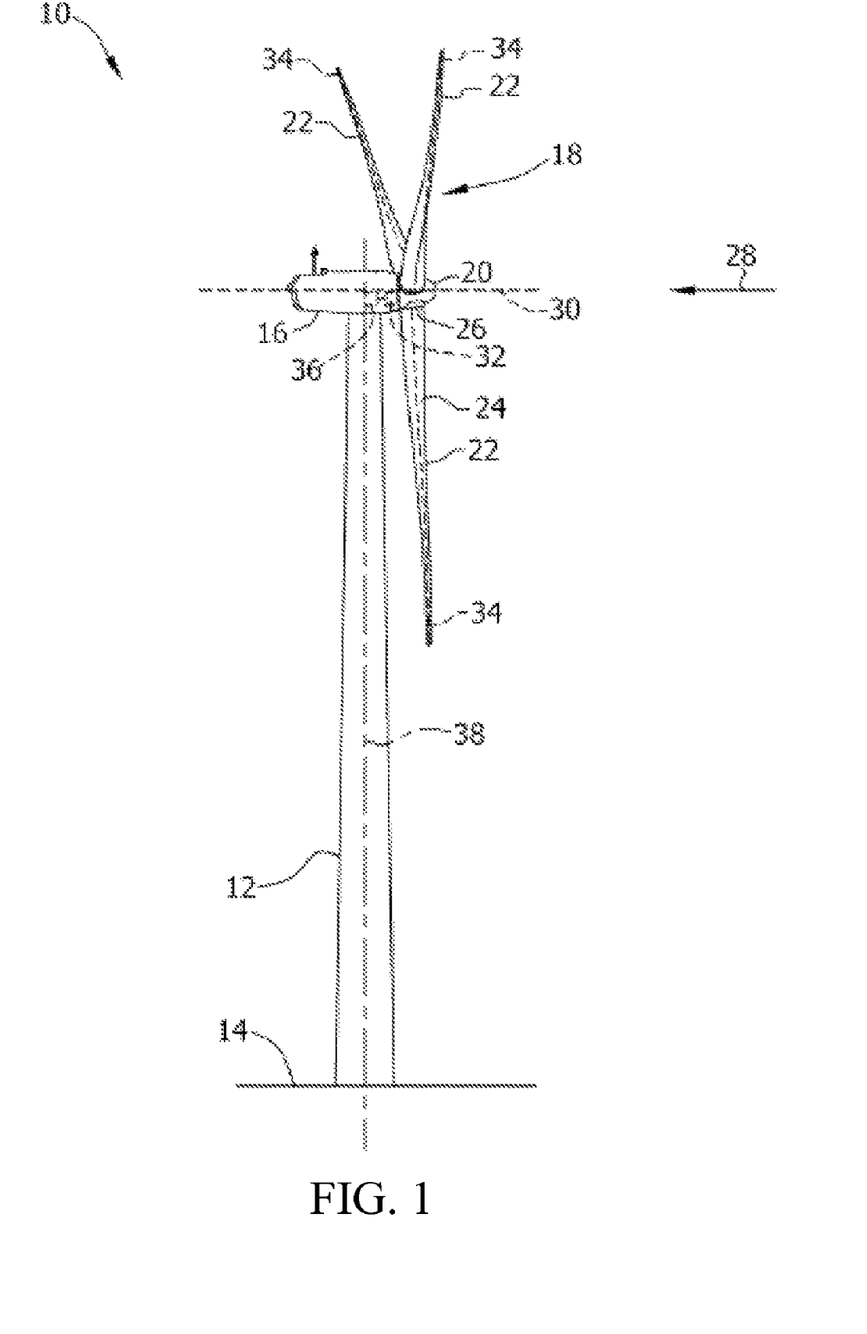
FIG. 1 illustrates a perspective view of a conventional wind turbine.

FIG. 1 illustrates a perspective view of a conventional wind turbine 10. As shown, the wind turbine 10 includes a tower 12 that extends from a support surface 14, a nacelle 16 mounted on the tower 12, and a rotor 18 that is coupled to the nacelle 16. The rotor 18 includes a rotatable hub 20 and at least one rotor blade 22 coupled to and extending outward from the hub 20. As shown, the rotor 18 includes three rotor blades 22. However, in an alternative embodiment, the rotor 18 may include more or less than three rotor blades 22. Additionally, in the illustrated embodiment, the tower 12 is fabricated from tubular steel to define a cavity (not illustrated) between the support surface 14 and the nacelle 16. In an alternative embodiment, the tower 12 may be any suitable type of tower having any suitable height.

The rotor blades 22 may generally be spaced about the hub 20 to facilitate rotating the rotor 18 to enable kinetic energy to be transferred from the wind into usable mechanical energy, and subsequently, electrical energy. Specifically, the hub 20 may be rotatably coupled to an electric generator (not illustrated) positioned within the nacelle 16 to permit electrical energy to be produced. Further, the rotor blades 22 may be mated to the hub 20 by coupling a blade root portion 24 to the hub 20 at a plurality of load transfer regions 26. Thus, any loads induced to the rotor blades 22 are transferred to the hub 20 via the load transfer regions 26.

As shown in the illustrated embodiment, the wind turbine 10 may also include a turbine control system or turbine controller 36 centralized within the nacelle 16. However, it should be appreciated that the turbine controller 36 may be disposed at any location on or in the wind turbine 10, at any location on the support surface 14 or generally at any other location. The controller 36 may be configured to control the various operating modes of the wind turbine 10 (e.g., start-up or shut-down sequences). Additionally, the controller 36 may be configured to control a pitch angle or blade pitch of each of the rotor blades 22 (i.e., an angle that determines a perspective of the rotor blades 22 with respect to the direction 28 of the wind) to control the load and power generated by the wind turbine 10 by adjusting an angular position of at least one rotor blade 22 relative to the wind. For instance, the controller 36 may control the blade pitch of the rotor blades 22, either individually or simultaneously, by controlling a pitch adjustment system 32. Pitch axes 34 for the rotor blades 22 are shown. Further, as the direction 28 of the wind changes, the controller 36 may be configured to control a yaw direction of the nacelle 16 about a yaw axis or the center line 38 of the tower 12 to position the rotor blades 22 with respect to the direction 28 of the wind. For example, the controller 36 may control a yaw drive mechanism (not illustrated) of the nacelle 16 in order to rotate the nacelle 16 about the tower center line 38

During operation of the wind turbine 10, wind strikes the rotor blades 22 from a direction 28, which causes the rotor 18 to rotate about an axis of rotation 30. As the rotor blades 22 are rotated and subjected to centrifugal forces, the rotor blades 22 are also subjected to various forces and bending moments. Thus, the rotor blades 22 may deflect from a neutral or non-deflected position to a deflected or loaded position, thereby reducing the tower clearance between the blade 22 and the tower 12. In order to monitor the position of the blades 22 and reduce the likelihood of a tower strike, a predetermined tower clearance threshold 54 (FIG. 2) may be established. Thus, if one or more of the blades 22 deflect beyond this tower clearance threshold 54, a corrective action, such as adjusting the pitch of the blades 22 or altering the tilt angle 68 (FIG. 5) of the nacelle 16, may be taken to increase the spacing between the tower 12 and the blade(s) 22. As used herein, the term "tower clearance threshold" generally corresponds to the minimum distance from the tower 12 at which the rotor blades 22 are maintained during operation of a wind turbine 10 so as to reduce the likelihood of a tower strike. Thus, it should be appreciated that the tower clearance 54 threshold may vary from wind turbine to wind turbine depending on, for example, the length of the rotor blades, the flexibility/rigidity of the rotor blades and/or the anticipated operating conditions of the wind turbine.

Figure 2:
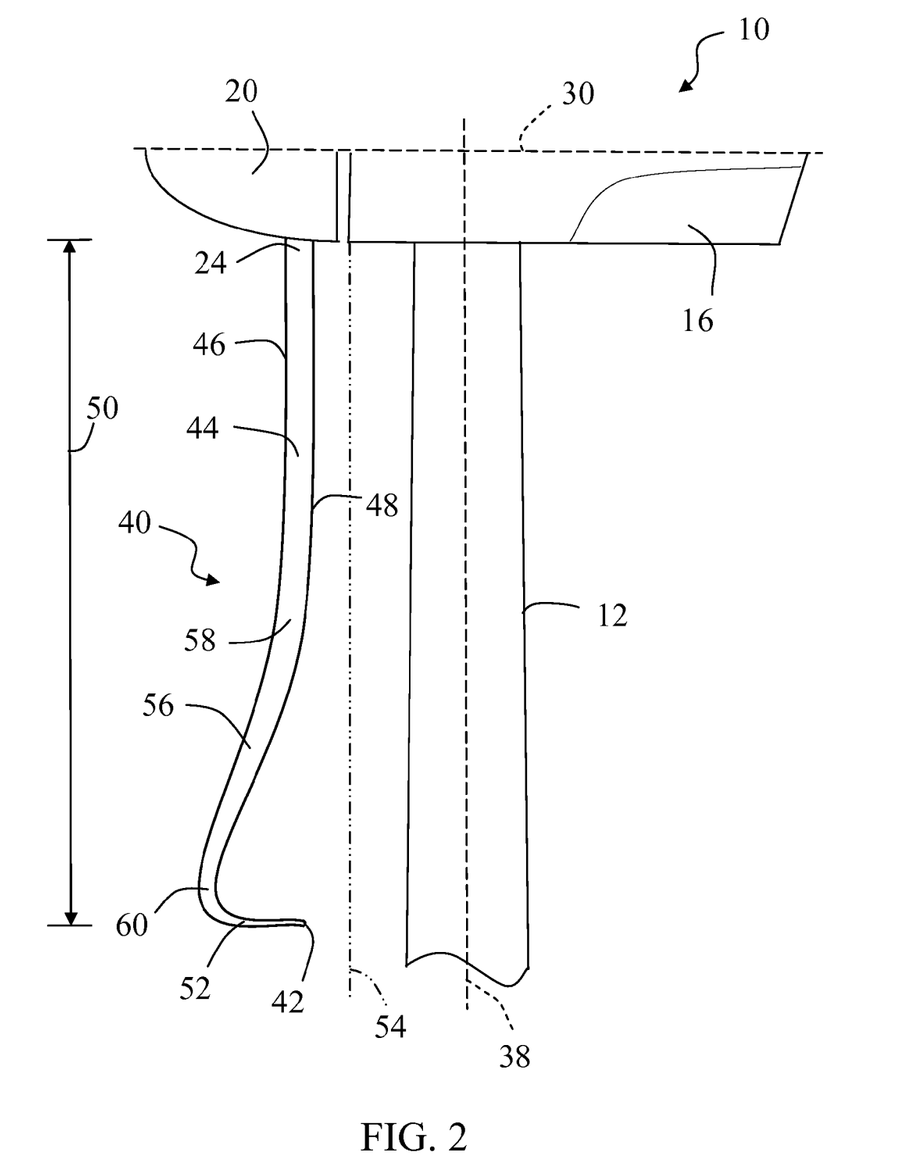
FIG. 2 illustrates a side view of one embodiment of a wind turbine rotor blade in accordance with aspects of the present subject matter.

Referring now to FIG. 2, there is illustrated a side view of one embodiment of a rotor blade 40 for a wind turbine 10. As shown, the rotor blade 40 includes a root portion 24 for mounting the blade 40 to the hub 20 of the rotor 18 (FIG. 1). The rotor blade 40 also includes a tip 42 disposed at an end of the blade 40 opposite the root portion 24. A body 44 of the rotor blade 40 generally extends between the root portion 24 and the blade tip 42 and defines a pressure side 46 and a suction side 48 of the rotor blade 40. Additionally, the body 44 may generally define a substantially aerodynamic profile to enable the blade 40 to capture kinetic energy from the wind using known airfoil principles.

FIG. 2 also illustrated a blade length 50 of the rotor blade 40. Generally, the blade length 50 may be defined in a longitudinal direction (i.e., a direction parallel to the center line 38 of the tower 12) between the interface of the root portion 24 and the hub 20 and the point on the blade 40 furthest from the axis of rotation 30 of the blade 40. As such, the interface of the rotor blade 40 and the hub 24 may define a 0% blade length and the outermost point of the blade 40 may define a 100% blade length. It should be appreciated that the rotor blade 40 may generally have any suitable blade length 50. For example, in one embodiment, the rotor blade 40 may have a length ranging from about 15 meters to about 91 meters, such as from about 20 meters to about 85 meters or from about 40 meters to about 55 meters and all other subranges therebetween. However, other non-limiting examples may include blade lengths of less than 15 meters or lengths greater than 91 meters.

Still referring to FIG. 2, the body 44 of the rotor blade 40 may also define a suction side winglet 52 terminating at the tip 42 of the blade 40. As indicated above, a suction side winglet may provide numerous performance advantages for a wind turbine 10 including, but not limited to, a reduction in drag, noise and wind turbine diameter, as well as an increase in power coefficient. Generally, the suction side winglet 52 may extend inwardly in a direction of the suction side 48 of the blade 40 (i.e., in a direction towards the tower 12 of the wind turbine 10). In one embodiment, the winglet 52 may be oriented such that it extends towards the tower 12 substantially perpendicularly to the center line 38 of the tower 12. However, in alternative embodiments, the winglet 52 may be oriented at any suitable angle relative to the center line 38 or to the suction side 48 of the rotor blade 40. Additionally, the particular size and shape of the winglet 52 may generally vary depending on, for example, the size and shape of the rotor blade, the anticipated operating conditions of the wind turbine and the desired performance of the wind turbine. Thus, it should be appreciated that the suction side winglet of the present subject matter may generally be configured as any winglet or other wingtip device known in the art for improving the aerodynamic efficiency and other performance-related parameters of an airfoil shaped body.

Further, as shown in FIG. 2, the rotor blade 40 may generally be configured such that the tip 42 of the rotor blade 40 is maintained, at the very least, at the predetermined tower clearance threshold 54 for the wind turbine 10. In particular, the rotor blade 40 may include an angled portion 56 extending away from the tower 12. As such, rotor blade 40 may be configured to include the inwardly extending suction side winglet 52 with no reduction in the distance between the blade 40 and the tower 12. For example, a conventional, straight rotor blade 22 is illustrated relative to the rotor blade 40 of the present subject matter in FIG. 5. As shown, the configuration of the rotor blade 40 described herein may permit the tip 42 of the blade 40 to be positioned at substantially the same location as the tip 80 of the conventional rotor blade 22. Thus, the rotor blade 40 of the present subject matter may be provided with the numerous performance advantages associated with a suction side winglet 52 without increasing the likelihood that the rotor blade(s) 40 will strike the tower 12 during operation of the wind turbine 10.

Referring still to FIG. 2, in one embodiment, the angled portion 56 may be disposed between a first bend 58 and a second bend 60 defined in the rotor blade 40. Generally, the first bend 58 of the rotor blade 40 may be configured such that the angled portion 56 extends outwardly in a direction of the pressure side 46 of the blade 40 (i.e., in a direction away from the tower 12 of the wind turbine 10). Thus, as shown in FIG. 2, the angled portion 56 may extend continuously away from the tower 12 between the first bend 58 and the second bend 60. However, it should be appreciated that, in alternative embodiments, the angled portion 56 need not extend continuously away from the tower 12 but, instead, may include one or more segments that extend parallel to or even towards the tower 12. Additionally, in the illustrated embodiment, the angled portion 56 of the rotor blade 40 is shown as being substantially curved along its length. In an alternative embodiment, however, it should be appreciated that the angled portion 56 may extend linearly between the first bend 58 and the second bend 60. It should be appreciated that the Willis "bend" and "bent," as used herein, may include both curved bends (e.g., bends characterized by smooth edges or that offer a smooth transition point), as shown by the first and second bends 58, 60 of FIGS. 3 and 4, and angled bends (e.g., bends characterized by edges that meet at a point or that offer a sharp transition point).

The second bend 60 defined in the rotor blade 40 may generally be configured such that the suction side winglet 52 extends inwardly a direction of the suction side 48 of the blade 40 (i.e., in a direction towards the tower 12). Thus, in one embodiment, the second bend 60 may generally define the interface between the angled portion 56 and the suction side winglet 52, with the suction side winglet 52 extending from the second bend 60 to the tip 42 of the rotor blade 40. Additionally, when the transition between the angled portion 56 and the winglet 52 is curved, such as when the second bend 60 is configured as a curved bend, the suction side winglet 52 may generally comprise a hooked winglet and, thus, define a radius (not illustrated) at the interface of the angled portion 56 and the winglet 52.

Figure 3:
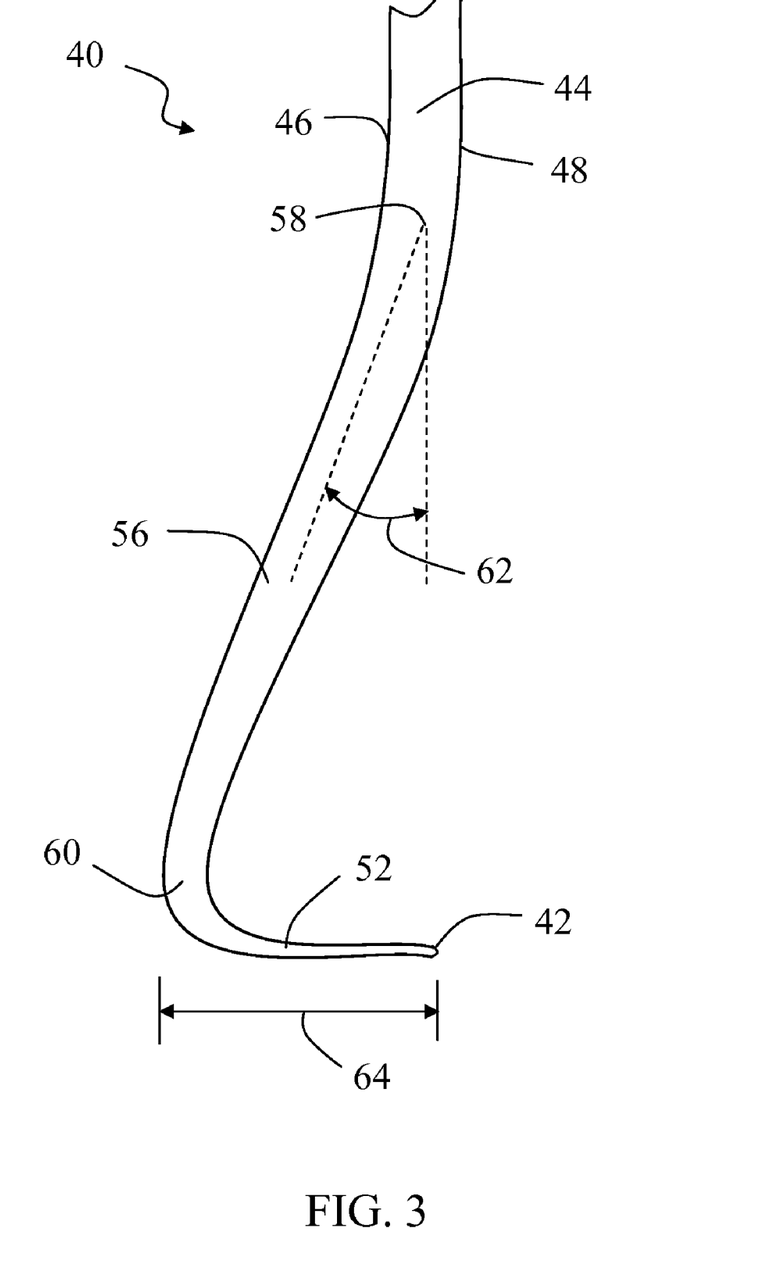
FIG. 3 illustrates an enlarged, partial view of the rotor blade illustrated in FIG. 2 in accordance with aspects of the present subject matter.

Referring now to FIG. 3, an enlarged, partial view of the rotor blade 40 depicted in FIG. 2 is illustrated. As shown, the angled portion 56 extends between the first and second bends 58, 60 defined in the rotor blade 40. Additionally, the suction side winglet 52 may extend between the second bend 60 and the tip 42 of the rotor blade 40. Generally, it should be appreciated that the rotor blade 40 may be bent or otherwise formed to have any shape or profile configured to maintain a desired tower clearance between the tip 42 and the tower 12 of the wind turbine 10. For example, as shown in FIG. 3, the rotor blade 40 may have a substantially curved profile between the first bend 58 and the tip 42 such that curved or smooth edges/transitions are defined at each of the bends 58, 60. Alternatively, the rotor blade 40 may have a substantially linear profile between the first bend 58 and the tip 40, with the bends 58, 60 defining sharp or non-curved edges. In a particular embodiment of the present subject matter, the profile or shape of the rotor blade 40 between the first bend 58 and the tip 42 may be configured as a cubic Bezier curve. For example, as is generally understood by those of ordinary skill in the art, a cubic Bezier curve can be constructed between two endpoints ($E_1$ and $E_2$) having coordinates $E_1(x_1, y_1)$ and $E_2(x_2, y_2)$, wherein the shape of the curve is controlled by two control points ($C_1$ and $C_2$) disposed on the same plane as the endpoints and having coordinates $C_1(x_3, y_3)$ and $C_2(x_4, y_4)$. Thus, as an example, the coordinates (X(t), Y(t)) of the rotor blade 40 illustrated in FIG. 3 between the position of the first bend 58 (e.g., $E_1$) and the tip 42 (e.g., $E_2$) can be modeled using the following equations:

$$X(t)=(1-t)^3 x_1+3t(1-t)^2 x_3+3t^2(1-t)x_4-t^3 x_2$$

$$Y(t)=(1-t)^3 y_1+3t(1-t)^2 y_3+3t^2(1-t)y_4+t^3 y_2$$

wherein: t is an independent variable that must take on a value between 0 and 1. However, it should be appreciated that the rotor blade 40 need not be configured as a cubic Bezier curve and, thus, may generally be configured consistent with various other suitable mathematical models known in the art.

Referring still to FIG. 3, a bend angle 62 of the angled portion 56 may be defined between the first and second bends 58, 60 relative to the longitudinal direction of the blade 40 (i.e., relative to the center line 38 of the tower 12 (FIG. 2)). Generally, the bend angle 62 may be chosen such that the angled portion 56 extends sufficiently away from the tower 12, thereby allowing a suitable clearance to be maintained between the tower 12 and the tip 42 of the rotor blade 40. For example, in one embodiment, the bend angle 62 may range from about 0 degrees to about 60 degrees, such as from about 10 degrees to about 45 degrees or from about 25 degrees to about 35 degrees and all other subranges therebetween. However, it should be appreciated that the bend angle 62 may generally vary for each rotor blade configuration depending on numerous factors including, but not limited to, a winglet height 64 and the position along the blade length 50 (FIG. 2) at which the first bend 58 is defined in the rotor blade 40. For example, as the height 64 of the winglet 52 is increased, the bend angle 62 may have to be increased to ensure proper clearance is maintained between the blade tip 42 and the tower 12. Similarly, as the position at which the first bend 58 is defined in the rotor blade 40 is moved further towards the tip 42, the bend angle 62 may need to be increased to accommodate the inwardly extending suction side winglet 52.

Still referring to FIG. 3, the winglet height 64 may generally be defined between the outermost point of the second bend 60 (e.g., the point on the blade 40 furthest from the tower 12) and the tip 42 of the blade 40. It should be appreciated that, similar to the bend angle 62, the desired height 64 of the suction side winglet 52 may generally vary depending on several factors including, but not limited to, the blade length 50 (FIG. 2) of the rotor blade 40, the flexibility/rigidity of the rotor blade 40, the overall configuration of the wind turbine 10 and the particular tower clearance threshold 54 chosen for the wind turbine 10. Additionally, winglet height 64 may also vary depending on the bend angle 62 and the position along the blade length 50 (FIG. 2) at which the first bend 58 is defined. In particular, as the bend angle 62 is increased or the position along the blade length 50 at which the first bend is defined is moved upwardly towards the root portion 24, the winglet height 64 may be increased. However, in one embodiment, the winglet height 64 may be equal to less than about 20% of the total length 50 (FIG. 2) of the rotor blade 40, such as from about 5% to about 20% or from about 10% to about 15% and all subranges therebetween.

Additionally, in the embodiment illustrated in FIGS. 2 and 3, the tip 42 of the rotor blade 40 is generally shown as being disposed at approximately the same distance from the tower 12 as the root portion 24 of the blade 40. However, it should be appreciated that, in various other embodiments of the present subject matter, the tip 42 may be disposed further away or closer to the tower 12. For example, in one embodiment, the suction side winglet 52 may have an increased winglet height 64 and/or the bend angle 62 may be reduced such that the clearance between the tip 42 and the tower 12 is less than the clearance between the root portion 24 and the tower 12. Alternatively, the winglet 52 may have a reduced height 64 and/or the bend angle 62 between the first and second bends 58,60 may be increased. As such, the clearance between the tip 42 and the tower 12 may be increased relative to the clearance between the root portion 24 and the tower 12.

Figure 4:
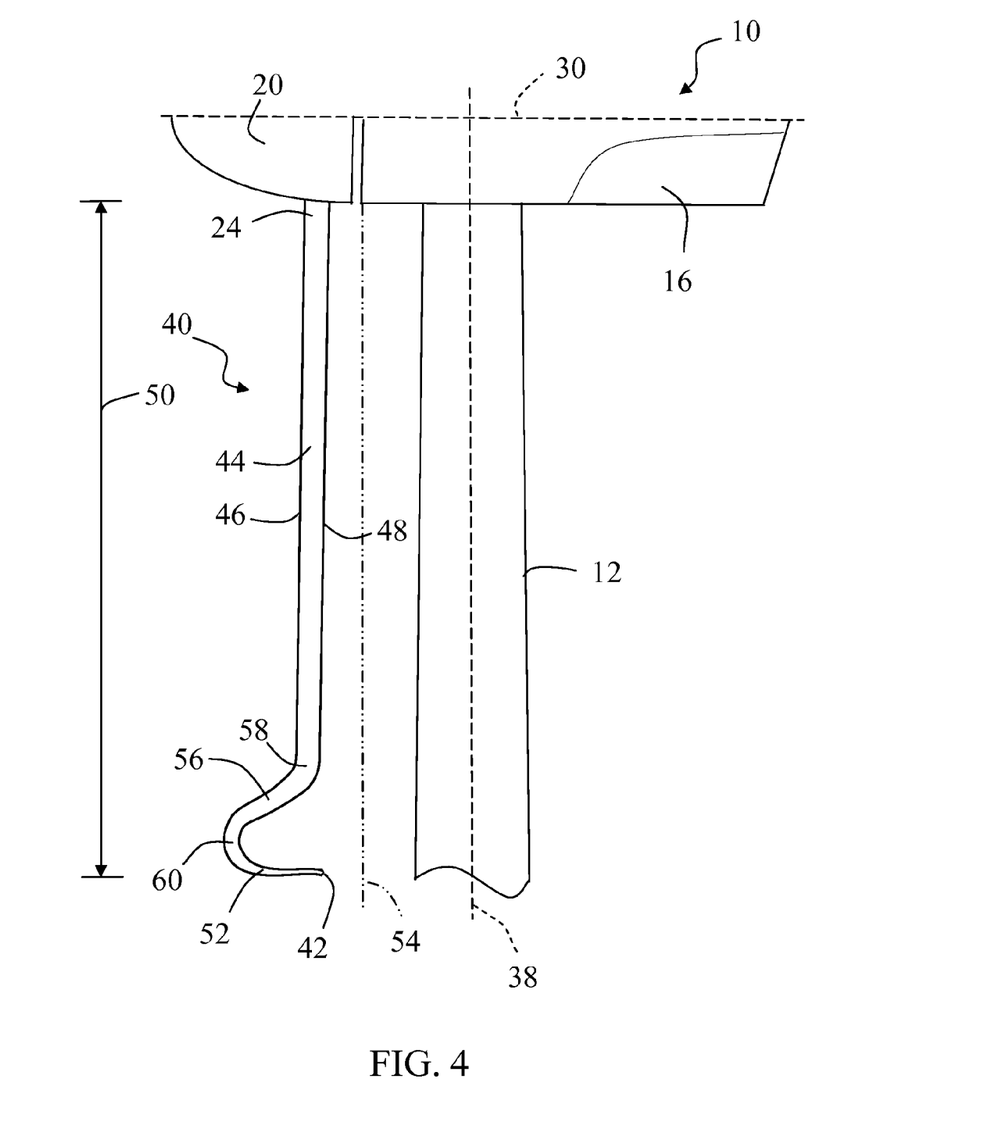
FIG. 4 illustrates a side view of another embodiment of a wind turbine rotor blade for a wind turbine in accordance with aspects of the present subject matter; and, FIG. 5 illustrates a side view of a further embodiment of a wind turbine rotor blade in accordance with aspects of present subject matter, particularly illustrating the rotor blade in a non-deflected/unloaded position and in a deflected/loaded position and comparing such positions to the position of a conventional, straight rotor blade.

Referring now to FIG. 4, another embodiment of a rotor blade 40 is illustrated in accordance with aspects of the present subject matter. As shown, the rotor blade 40 includes a root portion 24, a tip 42 and a body 44 extending between the root portion 24 and the tip 42. Additionally, the rotor blade 40 includes an angled portion 56 defined between a first bend 58 and a second bend 60. Further, a suction side winglet 52 is defined by the rotor blade 40 between the second bend 60 and the tip 42. However, unlike the embodiment illustrated in FIGS. 2 and 3, the first bend 58 is defined in the rotor blade 40 much further down along the length 50 of the blade 40. In particular, the first bend 58 of the rotor blade 40, depicted in FIGS. 2 and 3, is generally defined at approximately 60% of the total length 50 of the blade 30. In contrast, in the embodiment illustrated in FIG. 4, the first bend 58 is defined at approximately 85% of the total length 50 of the rotor blade 40. Thus, as shown, a larger portion of the body 44 extends substantially perpendicular from the axis of rotation 30. Additionally, in such an embodiment, the bend angle 62 (FIG. 3) between the first and second bends 58,60 must be relatively sharper/larger to accommodate a suction side winglet 52 of the same height 64 as the embodiment of FIGS. 2 and 3 and still maintain the rotor blade 40 at or beyond a minimum tower clearance threshold 54 during operation of the wind turbine 10. However, it should be appreciated that the first bend 58 of the rotor blade 40 may generally be defined at any suitable location along the length 50 of the rotor blade 40 and, thus, need not be defined at the blade lengths described above. As such, in one embodiment, the first bend 58 may be defined in the rotor blade 40 between 0% and about 95% of the total length 50 of the rotor blade 40, such as from about 0% to about 50% or from about 30% to about 70% or form about 60% to about 95% and all other subranges therebetween. One of ordinary skill in the art should appreciate that, by the first bend 58 being defined at a 0% blade length, it is meant that the first bend 58 may be defined at the interface between the root portion 24 and the hub 20 such that the angled portion 58 generally extends from such interface.

Figure 5:
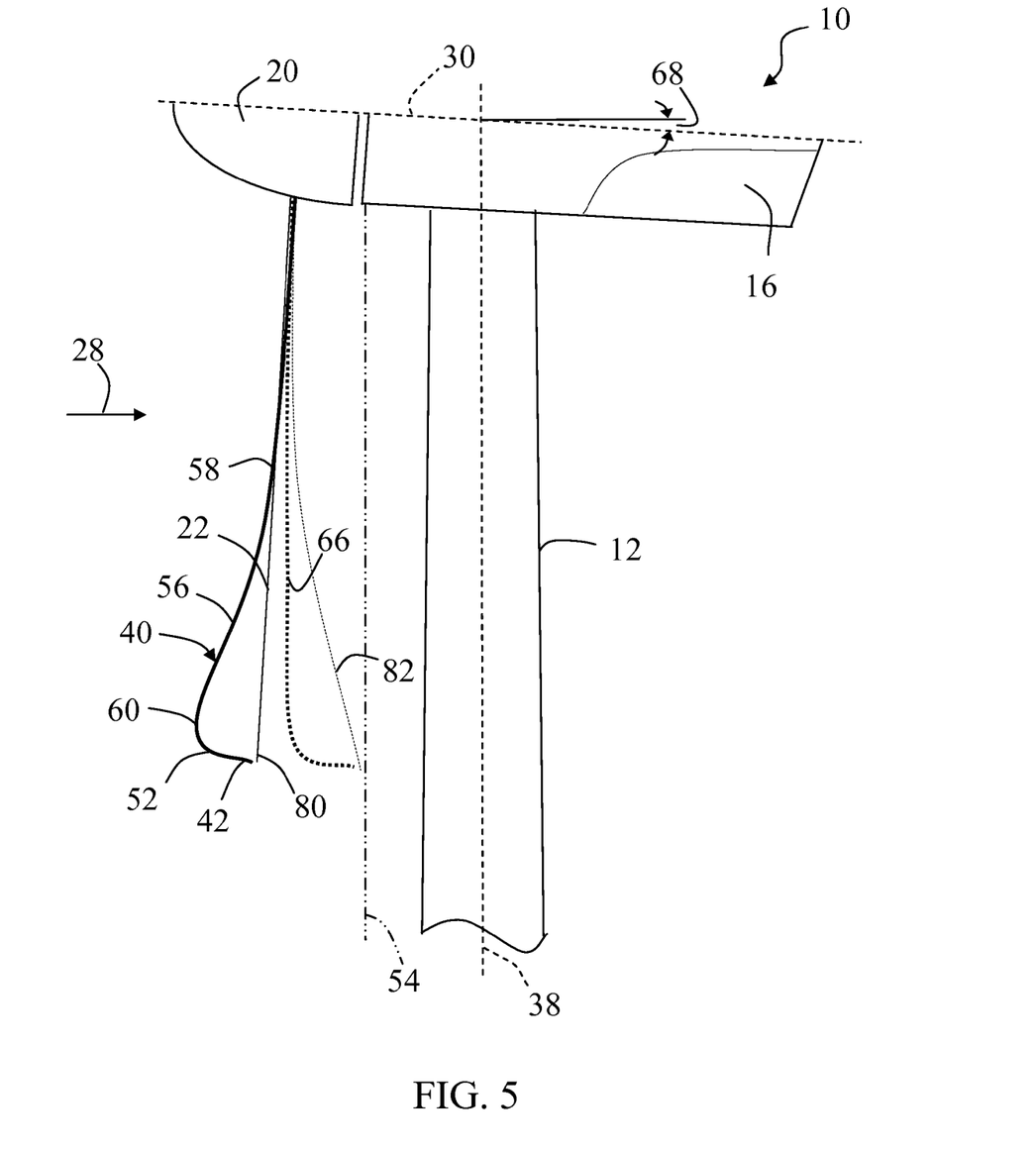

Referring now to FIG. 5, one embodiment of a rotor blade 40 configured as described herein is illustrated in a non-deflected/unloaded position and a deflected/loaded position 66. A conventional, straight rotor blade 22 is also illustrated in a non-deflected/unloaded position and a deflected/loaded position 82 for purposes of comparison. The rotor blade 40 generally includes an angled portion 56 defined between a first bend 58 and a second bend 60. Additionally, a suction side winglet 52 is defined in the rotor blade 40 between the second bend 60 and the tip 42. It should be appreciated that the nacelle 16 is shown in FIG. 5 as having an adjusted tilt angle 68. As is generally understood, the tilt angle 68 of the nacelle 16 may be altered during operation of a wind turbine 10 to angle the rotor blades away from the tower 12. The tilt angle 68 may generally be defined as a measure of the perpendicularity of the axis of rotation 30 to the centerline of the tower 38.

Referring still to FIG. 5, due to the configuration of the rotor blade 40, the blade 40 may generally be similarly positioned with respect to the tower 12 as the conventional rotor blade 22. As such, it should be appreciated that the rotor blade 40 of the present subject matter provides for the inclusion of a suction side winglet 52 without reducing the distance between the rotor blade 40 and the tower 12. Specifically, in one embodiment, the bends 58, 60 of the rotor blade 40 may be configured such that the tip 42 of the blade 40 is disposed at substantially the same location as the tip 80 of the conventional blade 22 during operation of the wind turbine 10. Thus, as the rotor blade 40 deflects in the direction 28 of the wind to its deflected/loaded position 66, the tip 40 of the rotor blade may be maintained at or beyond the same tower clearance threshold 54 as the conventional blade 22 in its deflected/loaded position 82. However, it should be appreciated that the rotor blade 40 of the present subject matter need not be configured such that the tip 40 is positioned in substantially the same location as the tip 80 of a conventional rotor blade 22. Rather, the rotor blade 40 may generally have any configuration that enables the tip 40 to be maintained at a tower clearance threshold 54 during operation of the wind turbine 10 so as to minimize the likelihood of a tower strike.

Moreover, it should be appreciated that the bends 58,60 may be configured to account for any variations between the magnitude of deflection exhibited by the rotor blade 40 of the present subject matter due to wind conditions and the typical deflection exhibited by a conventional rotor blade 22. For example, if the rotor blade 40 of the present subject matter is more stiff and, thus, exhibits less deflection than a conventional blade 22, the distance that the rotor blade 40 needs to be bent away from the tower 12 may be reduced. Alternatively, if the rotor blade of the present subject matter is configured such that it deflects further towards the tower 12 due to wind conditions than a conventional blade 22, the bends 58,60 can be designed to account for such additional deflection.

Further, it should be appreciated that the rotor blade 40 of the present subject matter may be manufactured by any suitable means known in the art. In one embodiment, the entire rotor blade 40 may be molded or otherwise formed as a single piece. Alternatively, the rotor blade 40 may be formed in segments. Thus, in one embodiment, the suction side winglet 52 may be formed as a separate component and then secured to the body 44 of the rotor blade 40 by any suitably means. In another embodiment, the angled portion 56 and the suction side winglet 52 may each be molded as separate segments and then combined with any other segments to form the rotor blade 40. In an even further embodiment, the angled portion 56 and suction side winglet 52 may be molded or otherwise formed as one single segment and thereafter combined with the remainder of the body 44 to create the rotor blade 40.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, the rotor blade comprising:
   a root portion;
   a tip; and,
   a body extending between said root portion and said tip, said body comprising a pressure side and a suction side, said body including a first bend and a second bend, said first bend being defined in said body between 0% and about 80% of a total length of the rotor blade such that a portion of said body extends outwardly in a direction of said pressure side; and,
   a suction side winglet formed in said body between said second bend and said tip, said suction side winglet extending inwardly in a direction of said suction side such that said tip is substantially aligned with a pitch axis of the rotor blade or is disposed between said pitch axis and a tower of the wind turbine.

2. The rotor blade of claim 1, wherein said portion of said body extends outwardly in a direction of said pressure side between said first bend and said second bend.

3. The rotor blade of claim 1, wherein said first bend defines a bend angle of less than about 60 degrees.

4. The rotor blade of claim 3, wherein said bend angle ranges from about 10 degrees to about 45 degrees.

5. The rotor blade of claim 1, wherein said first bend is defined in said body between 0% and about 60% of the total length of the rotor blade.

6. The rotor blade of claim 1, wherein said suction side winglet has a height equal to less than about 20% of the total length of the rotor blade.

7. The rotor blade of claim 6, wherein said height ranges from about 5% to about 20% of the total length of the rotor blade.

8. The rotor blade of claim 1, wherein said body defines a curved profile between said first bend and said tip.

9. The rotor blade of claim 8, wherein said curved profile is configured as a cubic Bezier curve.

10. The rotor blade of claim 1, wherein said suction side winglet extends inwardly in a direction of said suction side substantially perpendicularly to a centerline of the tower.

11. A wind turbine, comprising:
    a tower;
    a nacelle mounted atop said tower;
    a rotor coupled to said nacelle, said rotor comprising a hub; and,
    at least one rotor blade extending from said hub, said at least one rotor blade comprising:
       a root portion;
       a tip; and,
       a body extending between said root portion and said tip, said body including a first bend and a second bend, said first bend being defined in said body between 0% and about 80% of a total length of said at least one rotor blade such that a portion of said body extends in a direction away from said tower; and,
       a suction side winglet formed in said body between said second bend and said tip, said suction side winglet extending inwardly in a direction towards said tower such that said tip is substantially aligned with a pitch axis of said at least one rotor blade or is disposed between said pitch axis and said tower.

12. The wind turbine of claim 11, wherein said at least one rotor blade is configured to maintain said tip at or beyond a tower clearance threshold during operation of the wind turbine.

13. The wind turbine of claim 11, wherein said portion of said body extends in a direction away from said tower between said first bend and said second bend.

14. The wind turbine of claim 11, wherein said first bend defines a bend angle of less than about 60 degrees.

15. The wind turbine of claim 14, wherein said bend angle ranges from about 10 degrees to about 45 degrees.

16. The wind turbine of claim 11, wherein said suction side winglet has a height equal to less than about 20% of said total length of said at least one rotor blade.

17. The wind turbine of claim 11, wherein said at least one rotor blade defines a curved profile between said first bend and said tip.

18. The wind turbine of claim 17, wherein said curved profile is configured as a cubic Bezier curve.

19. The wind turbine of claim 11, wherein said first bend is defined in said body between 0% and about 60% of said total length of said at least one rotor blade.

20. The wind turbine of claim 11, wherein said suction side winglet extends inwardly in a direction of said tower substantially perpendicularly to a centerline of said tower.

* * * * *